United States Patent [19]

Moore

[11] 4,182,371
[45] Jan. 8, 1980

[54] AUTOMATIC LIQUID FLOW CONTROL DEVICE

[76] Inventor: Donald D. Moore, 5716 Benton Ave. South, Minneapolis, Minn. 55436

[21] Appl. No.: 851,275

[22] Filed: Nov. 14, 1977

[51] Int. Cl.$^2$ .................... A01G 25/00; F16K 31/365
[52] U.S. Cl. ........................ 137/624.11; 137/624.27; 251/61.1; 251/15
[58] Field of Search ...................... 137/624.11, 624.12, 137/624.14, 624.27; 251/15, 23, 22, 20, 49, 48, 73, 61.1

[56] References Cited

U.S. PATENT DOCUMENTS

| | | | |
|---|---|---|---|
| 1,297,563 | 3/1919 | Hardy | 251/49 |
| 3,022,977 | 2/1962 | Jones | 251/61.1 |
| 3,972,344 | 8/1976 | Chauvigne | 137/624.14 X |

Primary Examiner—Alan Cohan
Attorney, Agent, or Firm—Merchant, Gould, Smith, Edell, Welter & Schmidt

[57] ABSTRACT

An automatically actuated liquid flow control device or valve is provided which serves to start or stop the flow of a liquid, e.g., water, through a supply line at a desired time or, in the case of stopping the flow of a liquid, after a predetermined amount of liquid has passed through the valve. The liquid flow control valve includes an expandable balloon-like bladder or reservoir. The automatic liquid flow control valve is particularly adapted for use in conjunction with lawn or garden watering systems.

8 Claims, 8 Drawing Figures

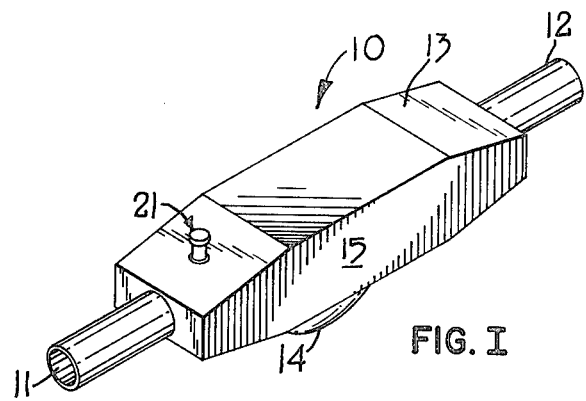
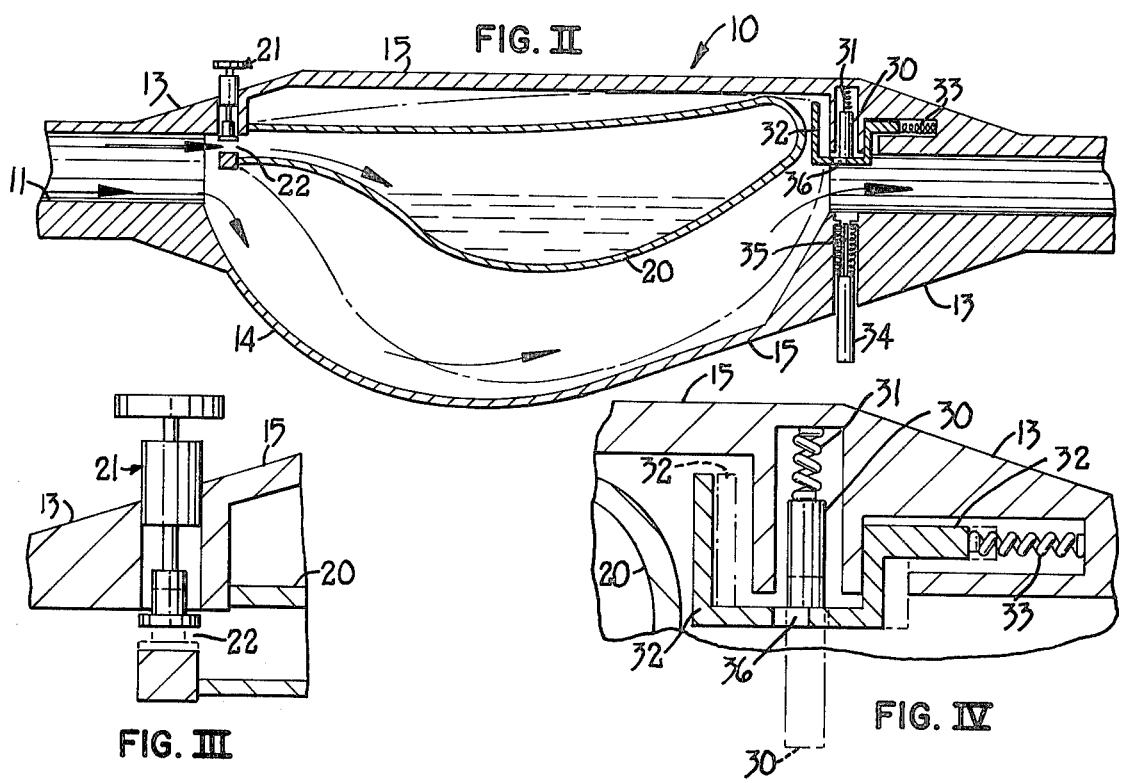
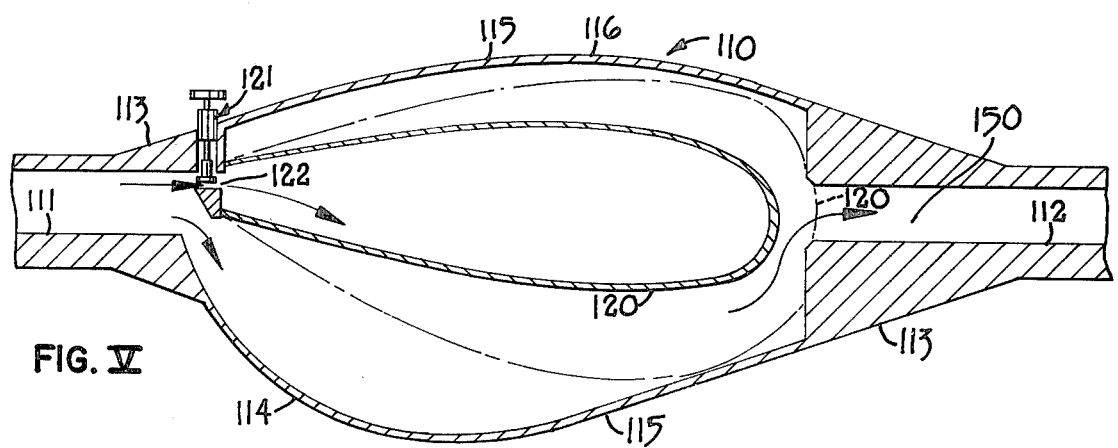

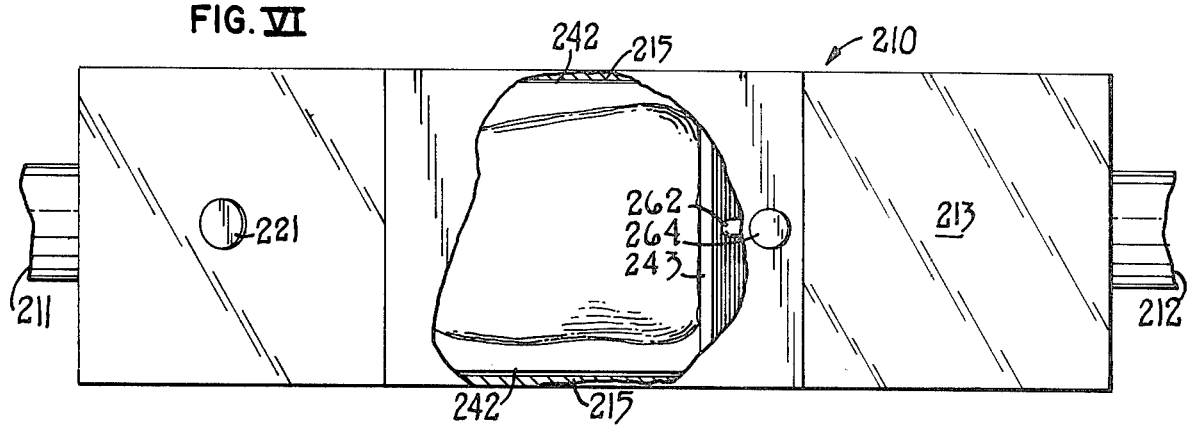
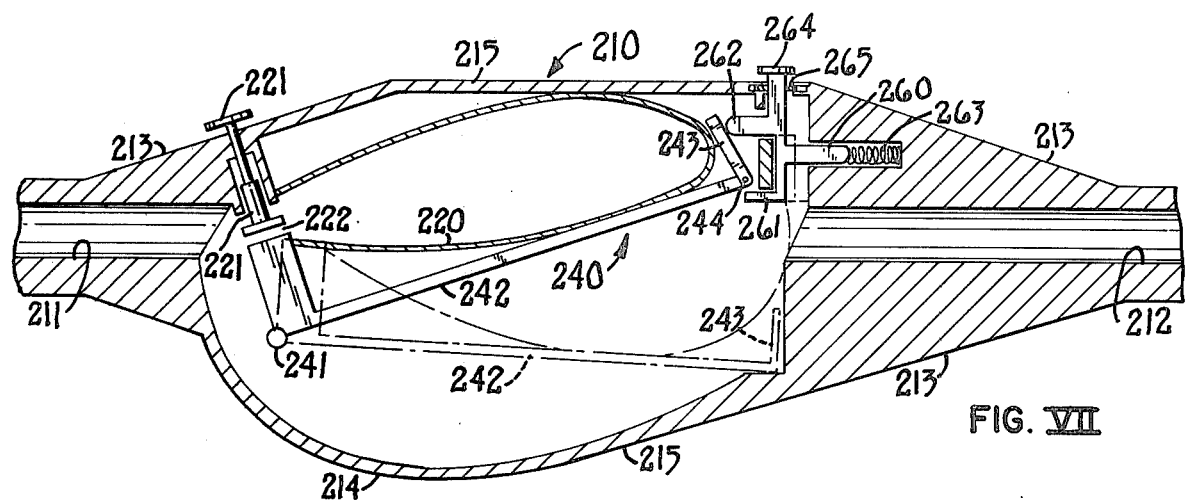
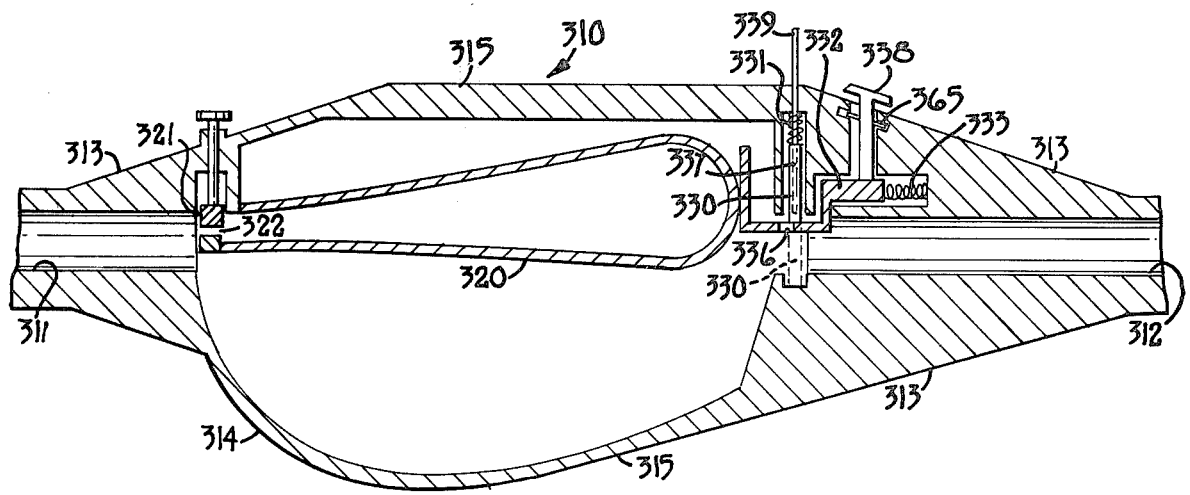

AUTOMATIC LIQUID FLOW CONTROL DEVICE

BACKGROUND OF THE INVENTION

The present invention relates generally to control valves or devices used to start or stop the flow of liquids and more particularly to control valves designed to start or stop the flow of a liquid after a predetermined time or, in the case of stopping the flow of a liquid, after a predetermined amount of liquid has flowed through the valve.

Automatic control valves are known which stop the flow of liquid after a predetermined amount of liquid has been delivered. For example, such valves are designed to permit filling of tanks with liquids and to automatically shut off after a certain number of gallons have been delivered. These valves avoid the necessity of having someone present to visually observe the filling of the tank and manually turn the flow off thereby preventing overflowing.

Flow control valves designed to automatically shut off the flow of a liquid after a predetermined period of time are also known in the art. See, for example, U.S. Pat. No. 2,769,574, issued Nov. 6, 1956 and U.S. Pat. No. 3,089,651, issued May 14, 1963. The known valves are relatively complicated in structure and have many moving parts. A number of them require an external mechanical or electrical timing device. Such complex valves may tend to malfunction and not stop the liquid flow as desired.

It is common knowledge that many resources which have heretofore been considered plentiful are actually limited in availability and should be conserved to the extent possible. Water is one of these limited resources. Recent water shortages in various areas of the United States have led to major efforts to conserve water. In many parts of the United States it is no longer possible to use as much water as one might like. For example, many communities permit watering of one's lawn or garden only during certain periods of time. Excess watering is considered wasteful and no longer allowed in some localities. In addition, only non-peak time (e.g. nighttime) watering is allowed in some localities.

SUMMARY OF THE INVENTION

The present invention provides an automatic liquid flow control device or valve which may be used in conjunction with a liquid supply line to stop or start the flow of liquid. The automatic liquid flow control valve includes an expandable reservoir or bladder. The expandable reservoir is located within a liquid-tight valve housing. The valve housing includes an inlet and an outlet. Both the inlet and the outlet may comprise couplers for mounting the valve in a liquid supply line, such as between two sections of garden hose. The expandable reservoir, when at least partially expanded by allowing it to fill with liquid, may, itself, stop the flow of liquid or actuate a valve gate. The valve gate may be designed to open or close thereby starting or stopping the flow of liquid, respectively.

The present invention has several advantages over the many prior art valves or devices designed to perform similar functions. The present invention is inexpensive and simple in construction. The present valve comprises few moving parts thereby decreasing the possibility of a malfunction. It does not require an external electrical or mechanical timing device.

The present invention is highly useful as part of a system for watering gardens, lawns or fields. The device of this invention allows lawns or gardens to be watered or fields to be irrigated at night with the flow of water being started or stopped at a predetermined time or after a predetermined amount of water has been delivered. Watering during nighttime hours has several advantages over daytime watering. For instance, it is known that watering foliage during the day while they are exposed to bright sunlight can actually harm them. Nighttime watering also has the advantage of minimizing evaporation, thus conserving water, since a greater percentage of the water used is available for absorption by the foliage being watered. In addition, watering at night has the advantage of using both water and electricity to pump the water during non-peak hours, when usage is at a minimum. Usage during non-peak times puts less strain on water and electric systems and reduces breakdowns.

While the invention will be disclosed with respect to a preferred embodiment in a lawn or garden water system, it will be understood that the broader scope of the invention applies to other applications such as irrigation systems. While the invention will be described with respect to specific shapes and types of expandable reservoirs, valve gates and housings, it will be understood that other configurations and devices which operate in the manner disclosed herein fall within the spirit and the intent of the invention.

BRIEF DESCRIPTION OF THE DRAWING

FIG. I is a perspective view of one embodiment of a valve constructed according to the principles of this invention.

FIG. II is a cross-sectional side view of the valve illustrated in FIG. I.

FIG. III is an enlarged view of valve 21 of FIG. II.

FIG. IV is an enlarged view of valve gate 30 and valve gate actuator 32 of FIG. II.

FIG. V is a cross-sectional side view of a second embodiment of a valve constructed according to the principles of this invention.

FIG. VI is a partial cross-section top view of a third embodiment of a valve constructed according to the principles of this invention.

FIG. VII is a cross-sectional side view of the valve illustrated in FIG. VI.

FIG. VIII is a cross-sectional side view of a fourth embodiment of a valve constructed according to the principles of this invention.

DETAILED DESCRIPTION OF A PREFERRED EMBODIMENT

Referring to FIGS. I–VIII wherein the same last two digits of two numerals represent like parts, a preferred embodiment of the automatic liquid flow control valve of this invention is generally shown by the numeral 10 in FIGS. I and II. Water flow control valve 10 includes housing 13. Housing 13 forms a cavity within which expandable bladder or expandable reservoir 20 and valve gate 30 are located. Housing 13 includes water inlet 11 which can be connected to a water faucet. Housing 13 includes water outlet 12 which can be connected to a sprinkler, garden hose or the like. Inlet 11 and outlet 12 may comprise standard garden hose connections when valve 10 is used with a standard garden hose or hoses to water a lawn or a garden. Housing 13 also includes housing wall 15 which is preferably relatively rigid except for portion 14 of housing wall 15. Portion 14 is pliable. The rigid portions of housing 13 can be made of metal, plastic, rubber, or the like. The pliable portion 14 can be made of pliable plastic, rubber, or the like.

As previously indicated, an expandable bladder or expandable reservoir 20 is located within housing 13. Expandable reservoir 20 is connected to valve member 21 which can be adjusted to vary the opening 22 to reservoir 20 as illustrated in phantom in FIG. III. Expandable reservoir 20 and valve member 21 are positioned so that a portion of the water entering valve 10 through inlet 11 will enter expandable reservoir 20 through opening 22 when valve member 21 is open, as illustrated in FIG. II. Expandable reservoir 20 can be made of pliable, preferably elastic, plastic, rubber, or the like.

Valve gate 30 is located within housing 13, as best illustrated in FIG. IV which is an enlarged view of the appropriate portion of FIG. II. Valve gate 30 is actuated by spring 31 shown in its compressed state in FIG. IV. Also located within housing 13 is valve gate actuator 32. Valve gate actuator 32 is actuated by spring 33 shown in its uncompressed state in FIG. IV. Depressing valve gate actuator 32 rightwardly compresses spring 33 as shown in phantom in FIG. IV. Valve gate actuator 32 includes opening 36 through which valve gate 30 can extend when valve gate actuator 32 and valve gate 30 are properly aligned.

Protruding out through and in water-tight contact with housing wall 15 is valve gate reset member 34. Valve gate reset member 34 is driven by spring 35. Depressing valve gate reset member 34 compresses spring 35 upwardly as illustrated in FIG. II.

When valve member 21 is at least partially open, a portion of any water flowing into valve 10 through inlet 11 will enter expandable reservoir 20 and cause expandable reservoir 20 to expand until it contacts valve gate actuator 32. The continued expansion of reservoir 20 will depress valve gate actuator 32 by compressing spring 33 until opening 36 is aligned with valve gate 30 and spring 31 drives valve gate 30 downwardly through opening 36, as illustrated in phantom in FIG. IV. When valve gate 30 has been thus actuated or closed, the flow of water through valve 10 is stopped. The time lapse before valve gate 30 will be actuated is controlled by adjusting valve member 21 to vary opening 22, and thus varying the ratio of water which enters expandable reservoir 20 as compared to the amount of water flowing through valve 10.

To reset valve 10 after valve gate 30 has closed, pliable portion 14 of housing wall 15 is squeezed to force the water out of expandable reservoir 20 and valve gate reset member 34 is depressed to force valve gate 30 back through opening 36 in valve gate actuator 32. When valve gate 30 has been completely pushed back through opening 36, spring 33 will expand pushing opening 36 in valve gate actuator 32 out of alignment with valve gate 30 and cause valve gate 30 to be held in its open position until valve gate actuator 32 is again depressed by expandable reservoir means 20.

A second preferred embodiment 110 of the invention is illustrated in FIG. V. Valve 110 comprises housing 113 including inlet 111 and outlet 112. Housing 113 includes housing wall 115. Portions 114 and 116 of housing wall 115 are pliable. Located within housing 113 is expandable reservoir 120. Expandable reservoir 120 is connected to valve member 121 which can be adjusted to vary the size of opening 122 to reservoir 120.

When valve member 121 is at least partially open, a portion of any water flowing into valve 110 through inlet 111 will enter expandable reservoir 120 and cause it to expand toward opening 150 in outlet 112. When reservoir 120 expands sufficiently, it will block and seal opening 150 and stop the flow of water through valve 110, as illustrated in phantom in FIG. V.

To reset valve 110, pliable portions 114 and 116 of housing wall 115 are squeezed to force the water out of expandable reservoir 120.

A third preferred embodiment 210 of the invention is illustrated in FIGS. VI and VII. FIG. VI is a partial cross-sectional top view and FIG. VII is a cross-sectional side view of the third preferred embodiment 210.

The structure of valve 210 is similar to valve 10. Valve 210 comprises housing 213 including inlet 211 and outlet 212. Housing 213 includes housing wall 215. Portion 214 of housing wall 215 is pliable. Located within housing 213 is expandable reservoir 220. Expandable reservoir 220 is connected to valve member 221 which can be adjusted to vary the size of opening 222 to reservoir 220.

Water flow control valve 210 includes flow control mechanism 240 located within housing 213. Flow control mechanism 240 is designed to rotate around pivot 241 as indicated by the change of position of mechanism 240 illustrated in phantom in FIG. VII. Flow control mechanism 240 includes flow control member 242 and flow control lever 243. Flow control member 242 and flow control lever 243 are joined at hinged portion 244. Both flow control member 242 and flow control lever 243 span the width of the interior of housing 213 and contact housing wall 215 in a water-tight fit as best seen in FIG. VI.

Flow control mechanism actuator 260 is located within housing 213. Flow control mechanism actuator 260 includes actuator shelf 261 on which hinged portion 244 rests when valve 210 is open, as illustrated in FIG. VII. Actuator 260 also includes actuator point 262. Actuator 260 is loaded by spring 263 which is shown in its uncompressed state in FIG. VII. Actuator 260 also includes flow control mechanism reset slide 264 which protrudes through housing wall 215. Gasket mechanism 265 assures that the portion of actuator 260 which extends through housing wall 215, maintains a water tight fit with housing wall 215.

When valve member 221 is at least partially open, a portion of any water flowing into valve 210 through inlet 211 will enter expandable reservoir 220 and cause reservoir 220 to expand. Reservoir 220 then will contact flow control lever 243 which will pivot on hinge portion 244 and contact actuator point 262 of flow control mechanism actuator 260. Actuator 260 will then be pushed rightwardly in FIG. VII, compressing spring 263, until actuator shelf 261 no longer supports flow control mechanism 240 at hinged portion 244 and flow control mechanism 240 drops down by rotating on pivot 241 as illustrated in phantom in FIG. VII. When flow control mechanism 240 has been thus actuated or closed the flow of water through valve 210 is stopped.

To reset valve 210 pliable portion 214 of housing wall 215 is squeezed to force the water out of expandable reservoir 220. At the same time flow control mechanism reset slide 264 is pushed rightwardly away from reservoir 220, depressing spring 263. As water is forced out of expandable reservoir 220, flow control mechanism actuator 260 moves upwardly until hinge portion 244 is above actuator shelf 261 at which time slide 264 is released and spring 263 expands, resetting flow control valve 210 by allowing hinge portion 244 to rest on actuator shelf 261.

A fourth preferred embodiment 310 of the invention is illustrated in FIG. VIII. While FIGS. I–VII illustrate valve embodiments designed to stop the flow of water, the valve embodiment illustrated in FIG. VIII is designed to start the flow of water. In many respects the structure of valve 310 is similar to valve 10. Valve 310 comprises housing 313 including inlet 311 and outlet 312. Housing 313 includes housing wall 315. Portion 314 of housing wall 315 is pliable. Located within housing 313 is expandable reservoir 320. Expandable reservoir 320 is connected to valve member 321 which can be adjusted to vary the size of opening 322 to reservoir 320.

Valve 310 includes valve gate mechanism 337 actuated by spring 331. Valve gate mechanism 337 includes valve gate 330, located within housing 313, and valve gate closing member 339 which extends through housing wall 315 in a water-tight fit.

Located within housing 313 is valve gate actuator 332. Valve gate actuator 332 is driven by spring 333 shown in its uncompressed state in FIG. VIII. Valve gate actuator 332 includes opening 336 through which valve gate 330 can extend when valve gate actuator 332 is properly aligned with valve gate 330. Valve gate actuator 332 includes valve gate actuator locking switch 338 which extends through housing 315. Gasket mechanism 365 assures that the portion of locking switch 338 which extends through housing wall 315, maintains a water-tight fit with housing wall 315. Locking switch 338 is used to align and misalign valve gate 330 with opening 336 in valve gate actuator 332.

To close valve 310 so that it is ready for operation, valve gate locking member 338 is moved rightwardly to compress spring 333 and to align valve gate 330 with opening 336 in valve gate actuator 332. While opening 336 and valve gate 330 are aligned, valve gate closing member 339 is depressed until all of valve gate 330 has passed through opening 336 at which time valve gate 330 is closed and water will not flow through valve 310. Valve gate locking member 338 is then released causing opening 336 to become misaligned with valve gate 330 and valve gate 330 to be locked in its closed position as shown in phantom in FIG. VIII. When valve gate 330 is closed, the water supply upstream to valve 310 may be turned on without water flowing through valve 310. If valve member 321 is at least partially open, the water pressure applied to valve 310 will cause water to enter expandable reservoir 320 and reservoir 320 will slowly expand until it contacts valve gate actuator 332. The continued expansion of reservoir 320 will depress valve gate actuator 332 by compressing spring 333 until opening 336 is aligned with valve gate 330 and spring 331 contracts and pulls valve gate 330 upwardly through opening 336, opening valve 310. The amount of time before valve gate 330 will open is controlled by controlling the rate at which water enters reservoir 320 by varying opening 322 by adjusting valve member 321.

While four specific embodiments of the invention have been disclosed, it should be understood that this is for the purpose of illustration only. Other modifications of the invention will be apparent to those skilled in the art in light of the foregoing description. The description is intended to provide specific examples of individual embodiments clearly disclosing the present invention, which is to be limited solely by the scope of the appended claims.

What is claimed is:

1. An automatic water flow control valve suitable for installation in a water supply line comprising:
    (a) housing means including inlet means and outlet means which are located relative to one another such that water entering through said inlet means will flow generally unidirectionally through the housing means at least as far as the outlet means;
    (b) valve gate means positioned within said housing means and adapted for opening and closing said housing means to the flow of water therethrough; and
    (c) expandable reservoir means located within said housing means, said reservoir means comprising a flexible bag having an open mouth and a substantially closed body, wherein said open mouth is fixed in said housing means as a sole source of support for said bag whose body is otherwise unsupported in the housing means, said open mouth being adjacent to and facing said inlet means with said bag extending from said mouth generally in the direction of the unidirectional water flow through the housing means such that the housing means is relatively compact, and wherein said open mouth is sized for receiving a portion of any water flowing through said inlet means to gradually expand said bag, said body of said bag serving to actuate said valve gate means when said bag expands to a particular extent.

2. An automatic flow control valve as defined in claim 1, including means for forcing water out of said bag.

3. An automatic flow control valve as defined in claim 2, wherein said bag includes a valve means for adjusting the ratio between the total flow of water into said valve and the water flow entering said bag.

4. An automatic flow control valve as defined in claim 3, wherein said valve gate means is adapted to close and stop the flow of water through said flow control valve when it is actuated by said bag.

5. An automatic flow control valve as defined in claim 4, wherein said valve gate means includes a manually operable reset means for returning said valve gate means to its open position.

6. An automatic flow control valve as defined in claim 5 wherein said valve gate means comprises a valve gate member and a spring for driving said valve gate member when said valve gate means is actuated by said bag.

7. An automatic flow control valve as defined in claim 3, wherein said valve means is located at said mouth of said bag, and wherein said valve means includes means for varying the size of said mouth.

8. An automatic water flow control valve suitable for installation in a water supply line comprising:
    (a) housing means including inlet means and outlet means;
    (b) valve gate means positioned within said housing means and adapted for opening and closing said housing means to the flow of water therethrough;
    (c) expandable reservoir means located within said housing means, said reservoir means comprising a flexible bag having an open mouth and a substantially closed body, said open mouth being located in said housing means for receiving a portion of any water flowing through said valve to gradually expand said bag, said body of said bag serving to actuate said valve gate means when said bag expands to a particular extent; and (d) means for forcing water out of said bag, wherein said forcing means comprises a portion of said housing means located adjacent said bag which portion is sufficiently pliable to allow said portion to be inwardly deformed to exert a collapsing force on said bag.

* * * * *